Sept. 14, 1943.   S. S. SMITH   2,329,661
DISPATCHING BOARD FOR CONDUIT SYSTEMS
Filed June 17, 1941
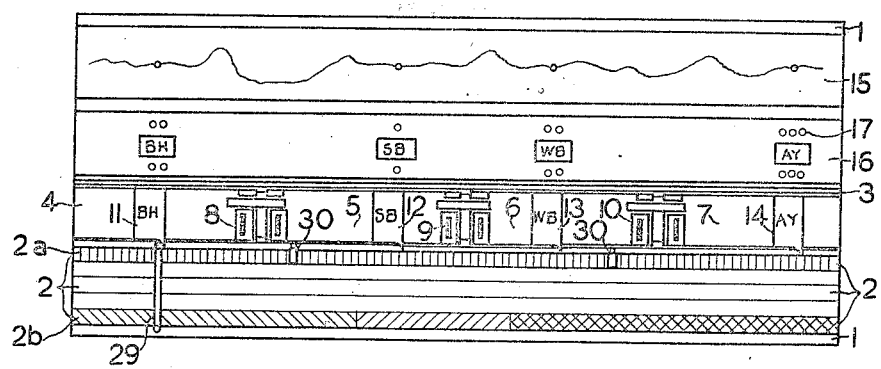
Fig. I
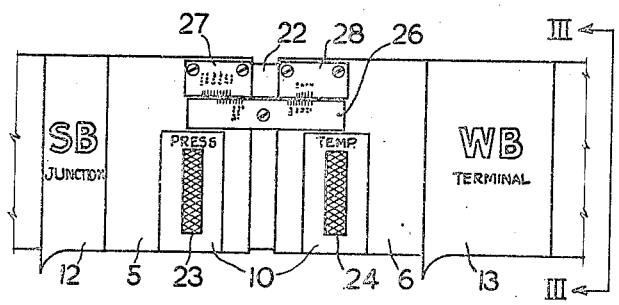
Fig. II
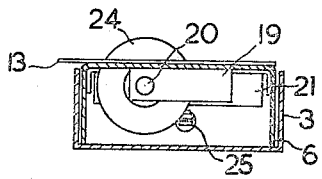
Fig. III
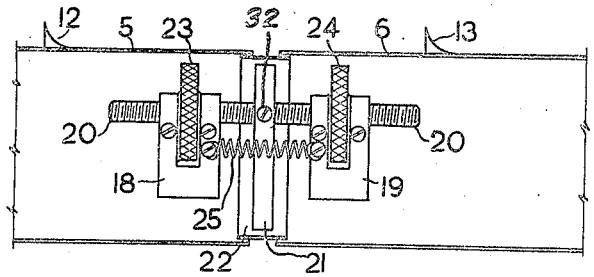
Fig. IV
Inventor: Sydney S. Smith
By his Attorney: H. Birch

UNITED STATES PATENT OFFICE 2,329,661

DISPATCHING BOARD FOR CONDUIT SYSTEMS

Sydney S. Smith, Scarsdale, N. Y., assignor to Shell Development Company, San Francisco, Calif., a corporation of Delaware Application June 17, 1941, Serial No. 398,507

8 Claims. (Cl. 116—114)

The present invention relates to a device suitable for rapidly checking the position of a fluid or fluids within conduits or the like and more particularly to the location of liquid products in cross-country pipelines.

It is common practice at present in the operation of cross-country pipelines, particularly those known as "products" lines wherein several similar or dissimilar fluids are transported simultaneously, to maintain in conjunction therewith a rather elaborate and complicated bookkeeping system in order that the relative positions of the various products in the pipeline may be determined when desired, this being necessary for divers reasons, as for example, when it is desired to withdraw a quantity of a given fluid from the line at an intermediate point along the line.

It is an object of the present invention to provide a dispatching board whereby the position of any given portion of fluid in a conduit system is indicated. Another object is to provide means whereby compensating corrections for changes in pressure and temperature within the conduit system may be easily and accurately made. A further object is to provide permanent accurate records of the quantities and type of fluids passed into a conduit system, and their ultimate disposition. Other objects, together with the numerous advantages to be derived when operating according to the present invention, will appear in the following detailed description of the invention.

Broadly, the present invention embodies a moving tape which is calibrated in volume units and is advanced in accordance with the input of fluid to the conduit system. For purposes of illustration the invention will be described as applied to gasoline products pipelines, i. e. cross-country pipelines through which a variety of products such as different grades of gasoline, naphtha, kerosene, special boiling point products, etc., are transported.

In the accompanying drawing, Figure I is a simplified plan view of a section of the dispatching board; Figure II is an enlarged plan view of the compensating controls; Figure III is an end view of the compensating controls; Figure IV is an underside view of the compensating controls.

Referring to the drawing, near the bottom of a panel 1, a space is provided for the tape 2 which may be advanced across the panel 1. Above the tape 2 and disposed parallel thereto is a trough member 3 in which a number of block members 4, 5, 6 and 7 are disposed. Compensating controls 8, 9 and 10 serve to interconnect adjacent blocks 4 and 5, 5 and 6 and 6 and 7 respectively.

Indicia plates 11, 12, 13 and 14 are mounted on blocks 4, 5, 6 and 7 respectively, as shown, these plates representing intermediate stations along the pipeline. If desired, a profile map 15 of the pipeline may be provided on the panel 1. A light panel 16, including indicating lights as at 17, may also be provided, these lights being utilized to indicate when pumps are operating, withdrawals being made, etc., at the various intermediate stations.

In Figures II, III and IV, showing details of the compensating controls, wheel cage members 18 and 19 are rigidly attached to the underside of blocks 5 and 6 respectively. Screw member 20 passes through wheel cages 18 and 19 and is rigidly mounted in member 21, which is in turn attached by means of screw 32 to flange member 22, upon which blocks 5 and 6 may slide. Scale plate 26 is also rigidly attached to flange member 22 and is spaced sufficiently above blocks 5 and 6 to permit their sliding movement therebeneath. Knurled wheels 23 and 24 are positioned within wheel cages 18 and 19 respectively and are threadedly mounted on screw member 20. A tension spring 25 is attached to wheel cages 18 and 19, as shown, and serves to take up any play in the screw mechanism. Scale plate 26 is provided with a calibrated temperature scale towards one end thereof and a calibrated pressure scale towards the other end thereof. Vernier scale plates 28 and 27 are mounted on blocks 6 and 5 respectively and opposite the temperature and pressure scales of scale plate 26, in the known manner.

The principle upon which the dispatch board operates is the movement of tape 2, representing the liquid passing through the line, across panel 1, representing the pipeline, tape 2 also passing indicia plates 11, 12, 13 and 14, representing intermediate stations along the pipeline. Tape 2 is calibrated across the top at 2a in units representing volume input to the pipeline and is provided with color bands 2b at the bottom, each color representing a different product. Indicia plates 11, 12, 13 and 14 are spaced apart on a scale accurately corresponding to the spacing of the various stations along the pipeline.

In detail, operation of the dispatch board is as follows:

Assuming station BH (indicia plate 11) to be the beginning of the pipeline, then block 4 on which indicia plate 11 is mounted will be rigidly fixed in trough 3. As pumping operations proceed, tape 2 will be advanced past marker 29, the length of tape passing corresponding to volume units pumped into the line. This procedure is continued until it is desired to pump a different product, at which time the tape 2 is cut at indicia plate 11 and another similar tape having a different color band 2b is attached to the cut end of the original tape. This operation is duplicated each time pumping of a different product is begun. When it is desired to remove a quantity of a given product at an intermediate point along the line, the tape is cut at the indicia plate corresponding to the actual withdrawal station and a section of tape of a length representing the quantity of product withdrawn is cut off. When pumping past this station is again resumed, the severed ends of the tape on the panel are joined together and advance of the entire tape recommenced as outlined above.

The section of tape removed serves, after being marked with the name of the withdrawal station, as a permanent record of quantity and type of product withdrawn and place of withdrawal.

Advance of the tape across the panel may either be manual, in which case the tape is intermittently advanced as periodic telegraphic or teletyped reports are received from the pumping station at the beginning of the line, or it may be automatically advanced by a clock-work or other means which is directly actuated by the pumping units themselves. The manual method, however, has been found eminently satisfactory and being less expensive and complicated, is preferably used.

Periodic reports are also received from all of the intermediate stations along the pipeline as to the temperature and pressure conditions in the line at that point. By means of this information, compensations are made on the dispatching board as follows: Assuming that a temperature rise occurs in the pipeline between stations SB and WB, then the latest reported temperature is set upon calibrated scales 26 and 28 of compensating controls 9 by means of knurled wheel 24. When this adjustment is made, block 6 will be moved towards block 5 by the screw mechanism shown in Figure IV. Since block 4 is rigidly fixed in trough 3 and is independently connected to block 5 by compensating controls 8 and since the remainder of the blocks beyond block 6 are similarly independently connected only to their immediately adjacent blocks, it will be seen that the change in the relative positions of block 5 to block 6 will have no effect upon the relative positions of any other two adjacent blocks. Thus, by bringing blocks 5 and 6 close together, indicia plates 12 and 13 will be brought closer together, resulting in a corrected reading on tape 2 as to the quantity of product in the pipeline between stations SB and WB at the operating temperature. Thus compensating corrections may be made on the dispatch board at the points corresponding to those in the pipeline where changes actually occur without affecting sections corresponding to points where operating variables remain constant. Pressure corrections are made by increasing the spacing between indicia plates as pressure rises occur and vice versa.

The paper tape thus always indicates on the dispatch board the exact location and quantity of the several products in the pipeline with reference to the location of the various stations along the pipeline. In utilizing the described invention it is always possible to determine at a glance what products are in the line by means of the various colored bands 2a at the bottom of the tape, where they are in the pipeline by noting their position with reference to the indicia plates, and the quantity of each product by noting the length of tape of any given color band. Further, since the input pumping rate usually is constant, the time at which any given product will begin to pass through any given intermediate station may be easily determined.

Small clips, as at 30, may also be attached to tape 2, these serving to indicate the position of pipe cleaners which are carried along by the stream in the line. By observing their position as they are carried across the dispatching board by the tape, the operators at the various stations along the line may be warned of their approach in order that they may be by-passed to avoid damage to screens, pumping mechanism, etc.

The dispatching board described is intended only as a specific embodiment of the invention, it being easily adaptable through slight modifications such as recalibration of the compensating control scales and the traveling tape, spacing of the indicia plates, etc., to other fluid carrying conduit systems, such as gas lines, irrigation systems particularly where various fertilizers and/or other chemicals are added to the irrigation water, piping systems in the various chemical and other manufacturing industries, etc.

I claim as my invention:

1. In a dispatching board for conduit systems carrying a plurality of separate bodies of liquid having non-identical properties the combination comprising a tape slidably arranged on said board and calibrated in accordance with and representing input of liquid to a conduit system and having distinctive means separately identifying each length of tape corresponding to the quantity of each liquid introduced to said conduit system, spaced indicia elements disposed on said board parallel to said tape, said indicia elements corresponding to points along said conduit system in scaled relation thereto and means adapted to vary the spaced relationship of any two adjacent spaced indicia elements without disturbing the spaced relationship of any other two adjacent indicia elements of said spaced indicia elements.

2. In a dispatching board for liquid carrying conduit systems the combination comprising a tape slidably arranged on said board and calibrated in accordance with and representing input of liquid to a conduit system, a plurality of spaced members disposed on said board parallel to said tape, independent means connecting adjacent members of said spaced members, indicia carried by said spaced members corresponding in scaled relationship to points along said conduit system, said connecting means being arranged and adapted to modify the spaced relationship of the corresponding adjacent spaced members connected thereto.

3. In a dispatching board for fluid carrying conduit systems the combination comprising a detachable tape slidably arranged on said board and calibrated in quantities representing input of fluid to a conduit system and spaced indicia elements disposed on said board parallel to said tape, said indicia elements corresponding to intermediate points throughout said conduit system in scaled relation thereto.

4. In a dispatching board for fluid carrying conduit systems the combination comprising a tape slidably arranged on said board and calibrated in accordance with and representing volume input of fluid to a conduit system, a plurality of spaced members disposed on said board parallel to said tape, independent means interconnecting each pair of adjacent members of said spaced members, and indicia in conjunction with said spaced members, said indicia corresponding to intermediate points throughout said conduit system in scaled relation thereto, said interconnecting means being arranged and adapted to vary the relative spacing between any pair of adjacent spaced members without disturbing the spaced relationship of any other pair of adjacent spaced members.

5. In a dispatching board for conduit systems carrying a plurality of separate bodies of liquid having non-identical properties, the combination comprising a detachable tape slidably arranged on said board calibrated in accordance with and representing input of liquid to a conduit system and having distinctive means separately identifying each length of tape corresponding to the quantity of each liquid introduced to said conduit system, spaced indicia elements disposed on said board parallel to said tape, said indicia elements corresponding in scaled relationship to intermediate points throughout said conduit system and means adapted to vary the spaced relationship of any two adjacent indicia elements without disturbing the spaced relationship of any other two adjacent indicia elements of said spaced indicia elements.

6. In a dispatching board for liquid carrying conduit systems the combination comprising a plurality of spaced indicia elements disposed in alignment on said board, said indicia elements corresponding in scaled relationship to intermediate points throughout said conduit system and means adapted to vary the spaced relationship of any two adjacent indicia elements without disturbing the spaced relationship of any other two adjacent indicia elements of said spaced indicia elements.

7. The dispatching board according to claim 3 including means calibrated in terms of temperature and pressure arranged and adapted to vary the relative spacing between two adjacent indicia elements in accordance with reported pressure and temperature changes within the conduit system without disturbing the spaced relationship of any other two adjacent indicia elements of said spaced indicia elements.

8. In a dispatching board for fluid carrying systems the combination comprising a tape slidably arranged on said board and calibrated in accordance with and representing input of fluid to a conduit system, spaced indicia elements disposed on said board parallel to said tape, said indicia elements corresponding in scaled relationship to points along said conduit system and means calibrated in terms of pressure and temperature adapted to vary the spaced relationship between adjacent indicia elements in accordance with reported temperature and pressure changes within the corresponding section of said conduit system and without disturbing the spaced relationship of any other pair of adjacent spaced indicia elements of said spaced indicia elements.

SYDNEY S. SMITH.